United States Patent [19]

Bauer

[11] 3,842,764

[45] Oct. 22, 1974

[54] SYSTEM FOR DISPOSING OF SEWAGE SLUDGE

[76] Inventor: William J. Bauer, 422 S. Park Rd., La Grange, Ill. 60525

[22] Filed: May 24, 1972

[21] Appl. No.: 256,380

[52] U.S. Cl. .................................................. 111/7
[51] Int. Cl. ............................................ A01c 23/02
[58] Field of Search ............................... 111/1, 6–7, 111/73, 81, 86, DIG. 1; 47/1; 239/177

[56] References Cited
UNITED STATES PATENTS

| | | | |
|---|---|---|---|
| 2,713,442 | 7/1955 | McFarling et al. | 111/86 X |
| 2,804,034 | 8/1957 | Hunter | 111/7 |
| 3,158,958 | 12/1964 | Gould | 111/1 X |
| 3,352,493 | 11/1967 | Curtis | 239/177 |
| 3,445,066 | 5/1969 | Mohar | 239/177 X |
| 3,536,261 | 10/1970 | Van den Brink | 239/177 |
| 3,753,409 | 8/1973 | Frazier | 111/6 |

OTHER PUBLICATIONS

The Metropolitan Sanitary Dist. of Greater Chicago, Chi., Ill., 1970, pp. 14, 46, 47, 68, 73, 83, 87, 90 relied on.

Primary Examiner—Robert E. Bagwill
Attorney, Agent, or Firm—Neuman, Williams, Anderson & Olson

[57] ABSTRACT

Sewage is concentrated to a sludge stage, and then conveyed to a field where a plow applicator injects the sludge into the ground and covers the sludge continuously as the applicator traverses the field. A long flexible supply conduit is connected between the plow applicator and a supply point for continuously supplying the sludge to the movable applicator.

10 Claims, 5 Drawing Figures

PATENTED OCT 22 1974
3,842,764

//  3,842,764

SYSTEM FOR DISPOSING OF SEWAGE SLUDGE

This invention pertains to the disposal of waste materials, and particularly to the disposal of sewage sludge.

Disposal of sewage materials, and particularly of the solids content of sewage, is a continuing and expanding problem. Many proposals have been made for solving this problem, including sewage digestion systems, storage lagoons, spreading on agricultural land and subsequent incorporation into the soil by tillage, oxidation, and processing to provide a fertilizer product. Many of these solutions require substantial capital investments relative to the quantity of material handled, and entail high operating costs. Moreover, some common practices, such as storing the sewage solids, normally with a relatively high water content, require the continual provision of additional storage space, and do not provide a permanent or long-range solution.

It is an object of this invention to provide an improved method and improved apparatus for disposing of sewage and which overcome the aforenoted problems.

It is another object of this invention to provide an improved method and apparatus for disposing of sewage and which avoid the requirements for and expense of digestion equipment and processing.

It is a further object of this invention to provide an improved method and apparatus for useful and permanent disposal of sewage sludge.

It is a further object of this invention to provide methods and apparatus meeting the aforementioned requirements and which are adapted to the handling of odorous materials.

It is an additional object of this invention to provide a method and apparatus for disposal of sewage sludge and which minimize potential pollution of the environment with soluble nitrogen.

It is a further object of this invention to provide improvements meeting the aforementioned requirements and which avoid large capital investments and which afford low operating costs.

In carrying out this invention in one illustrative form, a system is provided for delivering sewage sludge to an agricultural field site. At this site, the sludge is conveyed to a plow applicator having a plurality of blades which are drawn through the soil as the applicator traverses the field, with the sludge being injected into the soil immediately behind each of these blades and being promptly covered with soil as the respective furrow or trench is closed after passage of the respective blade.

For a more complete understanding of this invention, reference should now be had to the embodiment illustrated in greater detail in the accompanying drawing and described below by way of an example of the invention:

In the drawing, FIG. 1 is a schematic diagram of the system employing teachings of this invention;

Figure 1:
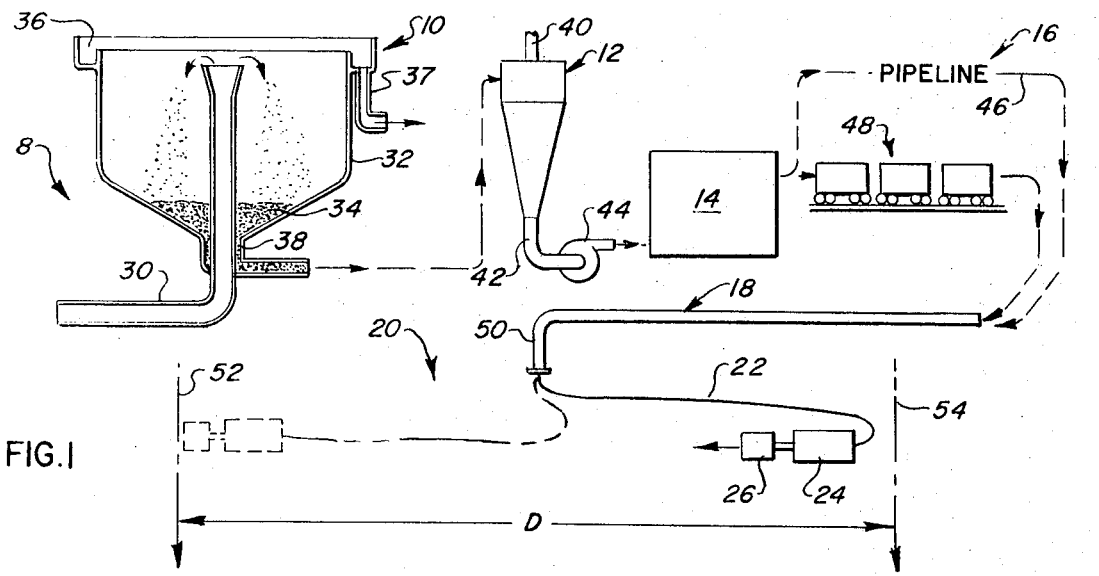

Referring now to FIG. 1 of the drawings, the system 8 includes generally a clarifier 10, a centrifuge 12, a heat exchanger 14, a transport system 16 including a fixed supply pipe 18 which terminates in or adjacent to an agricultural field at 20, a flexible supply conduit 22 and a plow applicator 24 which is drawn or driven across the field 20, as by a tractor unit 26. The various individual components of the system 8 may be of general types or constructions which are known to those skilled in the respective arts, and are illustrated schematically.

The clarifier 10 includes an inflow conduit 30 receiving a mixed sewage liquor inflow, as from a biological sewage treatment system (not shown). Such a system may comprise an activated sludge aeration tank or an aerated mixing lagoon. By way of example, the inflow material from such a system may consist of about 0.02 percent sludge solids. A tank 32 provides a large reservoir and thus a tranquil flow zone for the inflow materials. In this reservoir, the solid materials tend to settle and thus to form a sludge, such as of about 2 percent solids, in the lower section of the tank, as at 34. The clarified effluent overflows the top of the tank 32 and is collected in a trough 36 and drawn off through an outlet 37 for further treatment.

The partially concentrated sludge which collects at 34 is drawn off through a bottom outlet 38 and conveyed to the centrifuge 12. The centrifuge further concentrates the sludge solids, with the lighter fraction and clarified effluent being drawn off at 40 for further treatment, or for return to the beginning of the overall treatment system. The concentrated sludge obtained from the centrifuge, e.g., at about 10 percent solids, is drawn off through an outlet 42, through a pump 44, and directed to the heat exchanger 14 and then to the conveying system 16.

Heat exchanger 14 which may, for instance, be of the steam-heated, counter-current type, is included for heating the sludge for the purpose of destroying pathogens and parasites wherever that additional step may be necessary or desirable.

The transport or conveying system 16 may be a pipeline system, as indicated by the dashed line 46, for hydraulic conveyance of the concentrated sludge to the point of final disposal. Other conveying arrangements may be utilized, such as tank car trains illustrated schematically at 48, or tank trucks, with attendant storage ponds and pumping systems as required. The transport system 16 terminates in a conduit 18 having an outlet end 50. The outlet end 50 is in or adjacent a tillable agricultural area or field indicated generally at 20 between boundary lines 52 and 54.

The plow applicator 24 is of a design to form furrows, trenches, crevices or other similar openings in the soil as it traverses the field 20, with the sewage sludge being deposited in the respective openings and promptly covered by the soil as the applicator progresses. The plow is propelled by a tractor 26. The flexible conduit 22 is connected to the outlet 50 and to an appropriate manifold on the plow applicator for continually supplying the sludge material to the plow applicator as the applicator unit traverses the length "D" of the field 20. By providing the outlet 50 at a midpoint along the length of the field, the conduit 22 need be only about one-half the length of the field to be traversed.

Various types of tractors or other motive means may be utilized for propelling the plow applicator.

Figures 2, 3:
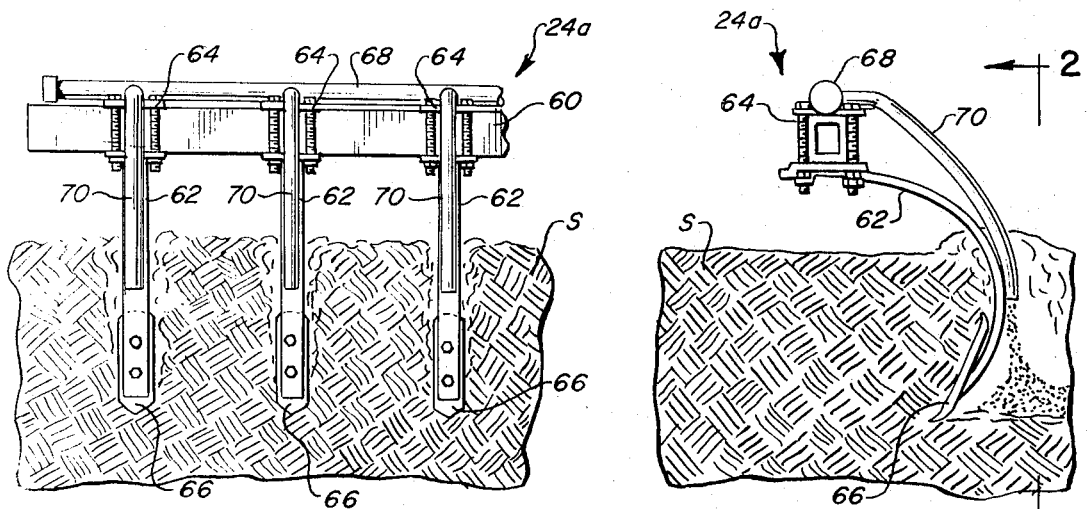
FIG. 2 is a diagrammatic rear view, taken generally along line 2—2 of FIG. 3, illustrating a portion of one type of plow applicator which may be utilized in practicing this invention.
FIG. 3 is an end view of the apparatus of FIG. 2.

A portion of one type of plow applicator is illustrated at 24a in FIGS. 2 and 3. In these illustrations, 60 designates a tool bar of a tillage-type implement, such as a chisel plow. A plurality of shanks 62 are secured to the tool bar 60, by appropriate clamping arrangements 64, which may include appropriate spring release mechanisms (not shown). A chisel point or blade 66 is attached to the distal end of each of the shanks 62, and serves as the working point and surface for penetrating the soil "S." A manifold conduit 68 extends along the tool bar 60. A plurality of branch line conduits 70 communicate with the manifold line 68. Each of the lines 70 extends downward along the rear side of the respective shank 62 and terminates in a lower end disposed to be beneath the surface of the soil when the respective digger 62, 66 is at normal operating depth in the soil, as seen generally in FIGS. 2 and 3. Each of these digger units or blades 62, 66 breaks and loosens the soil and forms a temporary furrow or passage as the unit passes, with the loosened soil promptly falling back into place and closing that furrow after the blade passes. The conduits 70 are positioned to discharge the sewage sludge into the lower portions of these trenches or furrows immediately behind the blades whereby the sludge is promptly, continuously and automatically covered by the soil falling into place in closing the furrows.

Figure 4:
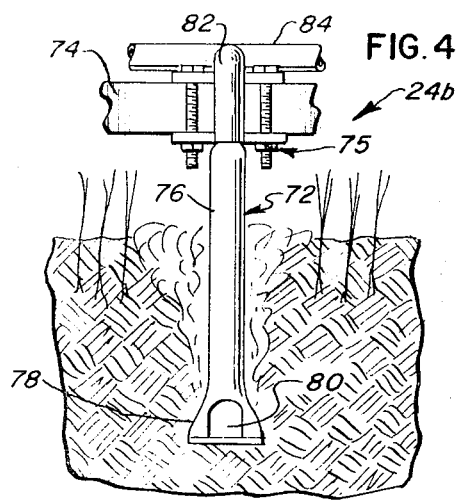
FIG. 4 is a diagrammatic view, taken generally along line 4—4 of FIG. 5, illustrating one blade unit of another type of plow applicator which may be utilized in practicing this invention.
Figure 5:
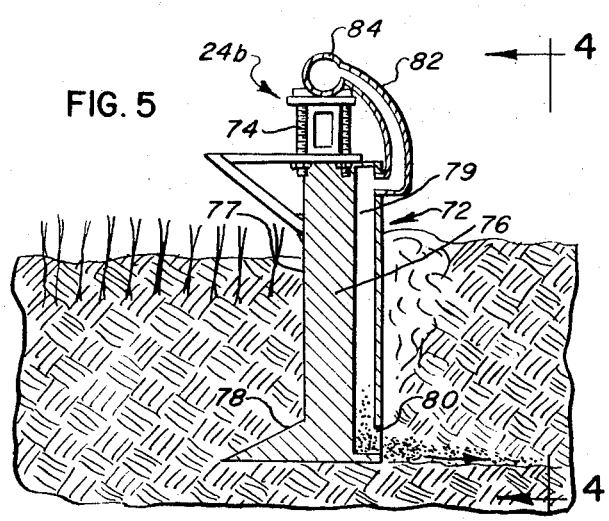
FIG. 5 is a vertical sectional view of the unit of FIG. 4.

FIGS. 4 and 5 illustrate another form of plow applicator unit 24b which may be utilized in practicing this invention. In the unit 24b, a plurality of rigid blades or arms 72 are secured to a suitable tool bar 74. Each of the units 72 includes a shank section 76 which is affixed to the bar 74, and which may have a sharpened leading edge 77. An enlarged burrowing point or share 78 is provided at the lower end of each unit 72. The share element 78 may be integral with the shank 76, or more preferably be a detachable and replaceable unit. The shank 76 is provided with an internal passage 79 which terminates at an outlet opening 80 immediately behind the section 78. A lateral conduit 82 communicates with the upper end of passage 79 and with a transverse manifold conduit 84 for supplying sewage sludge from the manifold conduit 84 to the passage 79 and thus to the outlet 80. With a plow applicator of the design illustrated with respect to unit 24b, as in the applicator 24a discussed above, furrows or trenches will be temporarily opened by each shank 76 and related point 78. The sludge will be deposited or injected into the lower portion of that ground opening, and will be promptly and continuously covered by the loosened earth which falls back into place to close that opening upon passage of the unit 72.

Other plow applicators similar to plow 24b may be utilized in the system 8, such as subsoil plows or plows of the type used for burying cable or conduits. By way of further example, a multiple-gang moldboard plow may be utilized with a sludge discharge outlet in position to discharge sludge into each open furrow just prior to the closing of that furrow by the dirt being turned by the next following moldboard. In such a unit, a manifold conduit may be positioned atop the main plow frame in a manner similar to the arrangements shown in units 24a and 24b, with lateral nozzles extending down to the aforedescribed discharge areas. Other types of furrow-opening devices, with appropriate related furrow closing and/or pressing apparatus such as disc coulters, shoes, blades or press wheels, may be utilized as desired.

Chisel-type plow applicators of the general type illustrated in FIGS. 2-3 are preferred as they more readily insure complete covering, incorporation and sealing in of the sludge by the dirt promptly and automatically upon passage of the implement.

It will be appreciated that by utilizing a closed conduit system and injecting the sludge into the soil as described above, the sludge will not be exposed to the atmosphere. Thus odorous sludges can be handled as the sludge will be kept entirely enclosed until it is buried in the earth and covered. The soil in which the material is injected, and sub-strata, serve as natural filter beds for retaining the sludge ingredients in the soil as the water is absorbed in the soil and/or moves downward in a leaching and filtering process. The sludge need not be digested, as the natural processes occurring in the earth will effect any further necessary breakdown and/or combination of the sludge materials in the soil constituents. A major portion of the sludge will thereby become plant nutrients, enriching the soil and enhancing the productivity of the field accordingly. Avoidance of the need for digesting the sludge avoids large capital costs for digestion equipment, and attendant operating costs. Moreover, handling and disposing of the sludge without final digestion greatly reduces the quantity of ammonia produced, thereby also minimizing potential pollution of ground water with soluble nitrogen.

If pathogens and/or parasites in the sludge present a problem in a given operation, they may be destroyed by appropriate treatment of the sludge such as by heating to a sufficiently high temperature in the heat exchanger 14. Under other circumstances the heat exchanger and the heating step may be omitted.

The method of disposing of sludge in accordance with this invention will be apparent from the aforementioned description of the components and operation of the system 8.

By way of a more specific illustration and summary, the mixed sewage liquor flowing into the clarifier 10 may be of about 0.02 percent solids content. The partially concentrated sludge conveyed from the clarifier to the centrifuge may be of about 2 percent solids content, with the sludge being conveyed to the field site and injected into the soil being of about 10 percent solids content. Assuming that a plow applicator treats a swath or strip of land about 7 feet wide in one pass, with continuous runs of a length D equal to one-fourth mile (1320 feet), the area treated is about one-fifth acre per traverse. Utilizing a conduit 22 which is 5 inches in diameter, flow rates of about 100 gpm, or 25 tons per hour, may be developed to the applicator. Assuming further that the sludge is to be applied at a rate of about 250 tons per acre, a traverse time of 2 hours would be required for the indicated application rate, or a speed of one-eighth mph. At 10 percent solids the 250 T/A application will result in about 25 tons dry matter per acre per application. One plow unit operating at the indicated rate for a 10 hour day would apply approximately 250 tons of sludge, and 12 such units would dispose of the sludge from a 3000 ton train consist in 10 hours.

It will be appreciated that the pumping rates, applicator traverse speeds, and net application rates may be varied widely in accordance with the particular applicator and with soil conditions, including natural water content, absorbency, and soil texture. With respect to the latter condition, the passage of the chisel units will break and loosen the soil, thereby greatly enhancing the capacity of the soil to absorb the water content of the sludge and to contain and seal-in the injected material.

Tank trucks may be used as the most advantageous transportation system to transport the sludge from smaller municipalities and/or remote industrial operations to the field site. Pressurized unloading systems may be utilized advantageously for unloading the sludge from mobile tanks, such as from tank trucks or tank cars.

It will be apparent to those skilled in the art that other modifications and embodiments of the specific method and apparatus disclosed herein may be made without departing from the spirit and scope of this invention. Particular operational, construction, and fabrication details of illustrative embodiments are disclosed only by way of example, and the various steps and components may be modified in other configurations and applications.

It will be seen that improvements have been provided which meet the aforestated objects.

While particular embodiments of the overall invention are shown and described herein, it will be understood, of course, that the invention is not limited to this particular disclosure, since many other modifications may be made by those skilled in the art, particularly in light of the teachings herein. It is contemplated, therefore, by the appended claims, to cover any such modifications as fall within the true spirit and scope of this invention.

What is claimed is:

1. A method of disposing of sewage sludge comprising conveying a concentrated aqueous sewage sludge to a fixed supply outlet located in the vicinity of a field, traversing said field with an implement having an element for opening a furrow in the soil, continually opening a furrow in the soil of such field with said implement during each such traverse, continually conveying said sludge from said fixed supply outlet to said implement through a flexible closed conduit and continually depositing said sludge from said implement into such furrow immediately behind said earth-opening element during each such traverse, and closing said furrow with soil over such deposited sludge immediately behind such implement during each such traverse.

2. A method as in claim 1 comprising opening a plurality of said furrows simultaneously with a plow having a plurality of earth opening elements, and depositing such sludge in the respective furrows immediately behind the respective elements.

3. A method as in claim 1 wherein said sludge is conveyed to said field through a pipeline system.

4. A method as in claim 1 wherein said sludge is conveyed to said field in mobile tanks.

5. A method as in claim 1 wherein said traversing implement has a plurality of such furrow-opening elements, including simultaneously opening a plurality of such furrows with said traversing implement during each such traverse, continually depositing such sludge in each of said furrows immediately behind the respective earth-opening elements, and closing said furrows with soil over such deposited sludge immediately after such deposition.

6. A method as in claim 1 in which said concentrated aqueous sewage sludge comprises more than about 2 percent solids.

7. A method as in claim 1 in which said concentrated aqueous sewage sludge is about 10 percent solids.

8. In a method of disposing of sewage materials including processing sewage solids to form a concentrated flowable undigested sewage sludge at a first site, the improvement comprising conveying said sludge in closed conveyance means and in an undigested state from said first site to a second site in the vicinity of a field, traversing said field with an implement having an element for opening a furrow in the soil, continually opening a furrow in the soil of such field with said implement during each such traverse, continually conveying said sludge from said second site to said implement in a flexible closed conduit and continually depositing said sludge from said implement into such furrow behind said element during each such traverse, and continually and promptly closing said furrow with soil over such deposited sludge immediately behind such implement during each such traverse.

9. A method as in claim 8 including treating said sludge prior to deposition to destroy pathogens and parasites therein.

10. A method as in claim 8 including heating said sludge prior to deposition to destroy pathogens and parasites therein.

* * * * *